(12) United States Patent
Karanikos et al.

(10) Patent No.: US 10,220,447 B2
(45) Date of Patent: Mar. 5, 2019

(54) POLISHING AND BRUSHING TECHNIQUES FOR CYLINDRICAL AND CONTOURED SURFACES

(71) Applicant: Apple Inc., Cupertino, CA (US)

(72) Inventors: Demetrios B. Karanikos, San Francisco, CA (US); Wayne H. Cowan, Santa Clara, CA (US); Paul J. Thompson, Mountain View, CA (US); Cheuk Nang Ho, Kwai Chung (HK)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/856,496

(22) Filed: Sep. 16, 2015

(65) Prior Publication Data
US 2016/0256931 A1 Sep. 8, 2016

Related U.S. Application Data

(60) Provisional application No. 62/129,918, filed on Mar. 8, 2015.

(51) Int. Cl.
*B23B 1/00* (2006.01)
*B23B 3/30* (2006.01)
(Continued)

(52) U.S. Cl.
CPC .............. *B23B 3/30* (2013.01); *B23Q 39/048* (2013.01); *B24B 9/00* (2013.01); *B24B 21/02* (2013.01);
(Continued)

(58) Field of Classification Search
CPC ......... B23B 3/30; B23B 2220/04; B23B 5/14; B23B 2220/28; B23B 2220/32;
(Continued)

(56) References Cited

U.S. PATENT DOCUMENTS 5,163,009 A * 11/1992 Yamane .................... B23B 3/30
29/36
5,285,572 A 2/1994 Rathi et al.
(Continued)

FOREIGN PATENT DOCUMENTS

EP 0888840 A1 * 1/1999 ........... B23Q 39/026

*Primary Examiner* — Alan Snyder
(74) *Attorney, Agent, or Firm* — Dickinson Wright RLLP

(57) ABSTRACT

Material removal processes of a structure are disclosed. These processes can define several features. For example, metal structure can include an interior recess surrounded by a sidewall. The structure can further include a base portion integrally formed with the sidewall. The sidewall can include an opening extending through the sidewall and into the interior recess. The sidewall can undergo a material removal process to include multiple curved regions. The sidewall, the first curved region, and the second curved region can be polished to include a reflectivity different than a reflectivity of an exterior region of the base portion. A single multi-axes lathe having multiple spindles performs several material removal processes under a continuous machine cutting process. The spindles may include clamping features that allow a first spindle to perform a first operation then pass the metal structure to a second spindle. Additional processes include lapping, polishing, and linear brushing.

13 Claims, 15 Drawing Sheets

(51) Int. Cl.
*B23Q 39/04* (2006.01)
*B24B 21/02* (2006.01)
*B24B 29/04* (2006.01)
*B24B 37/04* (2012.01)
*B24B 9/00* (2006.01)
*B23Q 39/00* (2006.01)

(52) U.S. Cl.
CPC .............. *B24B 29/04* (2013.01); *B24B 37/04* (2013.01); *B23B 2220/04* (2013.01); *B23Q 2039/008* (2013.01); *G05B 2219/37428* (2013.01)

(58) Field of Classification Search
CPC ............ B23B 2270/205; B23Q 39/048; B23Q 2039/008; G05B 2219/37428
See application file for complete search history.

(56) References Cited

U.S. PATENT DOCUMENTS

| | | | | |
|---|---|---|---|---|
| 5,842,393 | A | * | 12/1998 | Nagel ........................ B23B 3/30 29/36 |
| 5,904,457 | A | * | 5/1999 | Suwijn .................... B23F 23/12 318/571 |
| 6,883,407 | B2 | * | 4/2005 | Smith ................. B23B 31/4033 279/155 |
| 6,925,353 | B2 | | 8/2005 | Vollmayr et al. |
| 7,032,484 | B2 | * | 4/2006 | Kobayashi .............. B23B 3/168 82/117 |
| 2011/0189924 | A1 | | 8/2011 | Erickson |

* cited by examiner

POLISHING AND BRUSHING TECHNIQUES FOR CYLINDRICAL AND CONTOURED SURFACES

This application claims the benefit of priority under 35 U.S.C. § 119(e) to U.S. Provisional Application No. 62/129,918, filed on Mar. 8, 2015, the disclosure of which is incorporated herein by reference in its entirety.

FIELD

Field

The described embodiments relate generally to a metal substrate undergoing various machining operations. In particular, the present embodiments relate to forming and finishing the metallic substrate to form a cosmetic housing suitable for use with a charging device that charges a consumer electronics device.

Background

The use of forging and deep drawing techniques for deforming metallic structures into a finished product is generally known in the art. Forging techniques can include application of heat and deformation (for example, striking with a hammer) to a metallic structure. Deep drawing can include exposing the metallic structure to a series of dies, with each successive die providing an additional deformation to the metallic structure.

However, these techniques have undesirable drawbacks. For example, during a deep drawing process, the deformed metallic structure may harden, which may strengthen the metallic structure by plastic deformation. As a result, the metallic structure becomes more difficult to perform a subsequent material removal operation, such as cutting. In some cases, an expensive, high-end cutting tool may be required so that the cutting tool does not break or quickly become dull during a cutting operation. Accordingly, such a tool adds costs to the overall process.

In addition, the forging and deep drawing techniques can require multiple steps along an assembly process that require transfer from one sub-assembly to another sub-assembly. This is undesirable when the metallic structure must be mass-produced with tight tolerances.

SUMMARY

In one aspect, a cutting and machining method operable by a multi-axis lathe tool having multiple spindles, each of which is configured to secure a substrate, is described. The cutting and machining method may include performing a first cutting operation at a cutting surface of the substrate with a first spindle to define an interior recess of the substrate. The first cutting operation may include a contact cycle between the cutting surface and a first cutting tool. The contact cycle may include engaging the substrate at the cutting surface with the first cutting tool to remove material from the substrate. The contact cyclone may further include disengaging the cutting surface from the first cutting tool to allow dissipation of at least some heat generated from the engaging the cutting surface with the first cutting tool.

In another aspect, a cutting apparatus suitable for cutting a substrate used to form an enclosure feature used with an inductive charging station having an inductive coil is described. The cutting apparatus may include a first cutting tool that performs a first cutting operation in which the first cutting tool further engages the substrate to cut material away from the substrate and disengages the substrate to allow at least some heat, created by the cutting, away of the material, to leave the substrate. The cutting apparatus may further include a second cutting tool that performs a second cutting operation different from the first cutting operation. In some embodiments, the first cutting tool cuts away the material from the substrate to define an interior recess capable of receiving the inductive coil.

In another aspect, a non-transitory computer readable storage medium storing instructions that, when executed by a processor, cause the processor to implement a method for cutting and machining a substrate, is described. The method may include performing a first cutting operation at a cutting surface of the substrate with a first spindle to define an interior recess of the substrate. The first cutting operation may include a contact cycle between the cutting surface and a first cutting tool. The contact cycle may include engaging the substrate at the cutting surface with the first cutting tool to remove material from the substrate. The contact cyclone may further include disengaging the cutting surface from the first cutting tool to allow dissipation of at least some heat generated from the engaging the cutting surface with the first cutting tool. The method may further include transitioning the substrate from the first spindle to a second spindle. The method may further include securing the substrate with the second spindle at the interior recess. The method may further include performing a second cutting operation with a second cutting tool engaging the substrate secured with the second spindle to define an exterior region of the substrate.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
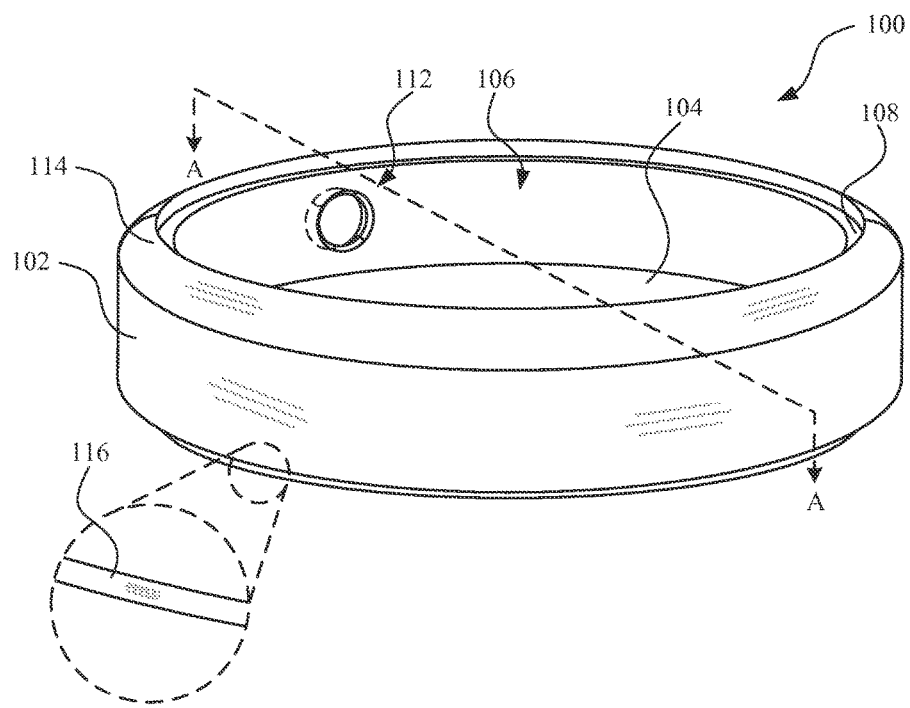
FIG. 1 illustrates an isometric view of an embodiment of an enclosure feature.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to various processes performed on a metal structure to form an enclosure feature. The metal structure may be in the form of a metal substrate or ingot. The processes include material removal process such as machine cutting, grinding, lapping, polishing, and/or linear brushing. Together, the material removal processes can define the enclosure feature and the remaining metal structure can undergo similar material removal processes to form additional enclosure features. In some cases, the enclosure feature is used as a housing for an electrical charging device, such as an induction charging station used to charge an electronic device.

One or more cutting processes may involve securing the metal structure used to form the enclosure feature to a multi-axis lathe tool that positions the metal structure in various orientations to perform one or more cutting operations. The multi-axis lathe tool may include several spindles, each of which is designed to rotate the metal structure about a longitudinal axis extending through a lengthwise dimension of the metal structure. Also, the multi-axis lathe tool may be disposed in a single housing. Further, the multi-axis lathe tool may be designed to cut the metal structure under a continuous process within the single housing. For example, the multi-axis lathe tool may include a first spindle that secures an exterior region of the metal structure such that one or cutting tools of the multi-axis lathe tool may perform cutting operations to define an interior recess and a sidewall of the enclosure feature. Further, additional cutting operations can be performed to define several curved regions on an exterior region of the sidewall. After these cutting operations, a second spindle, using a special fixture or end effector, secures with the metal structure via the interior recess and the sidewall. Then, a subsequent cutting operation can cut away the processed region of the metal structure away from the remaining metal substrate. The remaining metal substrate can undergo the initial cutting processes to form additional enclosure features.

The second spindle then carries the (partially formed) enclosure feature and is designed to actuate, or rotate, the enclosure feature and additional cutting tools can perform additional cutting operations to an exterior of the enclosure feature. For instance, a base portion integrally formed with the sidewall can undergo one or more cutting operations to an exterior region of the base portion. The phrase "integrally formed" as used throughout this detailed description and in the claims refers to a structure having two or more features formed from a single, unitary piece of material. The formation may be through a subtractive manufacturing process that removes material from the structure to define the two or more features. In order to provide a more consistent finish, a single cutting tool is used to perform cutting operations to the base portion and to the curved region that transitions from the base portion to the sidewall. Also, the enclosure feature may further receive one or more cutting operations to define an opening in the sidewall.

The described cutting and machining processes are designed to allow for relatively fast processing by performing a cutting operation and then transitioning the enclosure feature between spindles to quickly continue to a subsequent cutting operation. Also, because the multi-axis lathe tool can perform these cutting operations in the single housing, the cutting operations are performed with minimal time leading to higher throughput. Also, the multi-axis lathe tool not only actuates the spindles by rotational movement, but also repeatedly actuates the spindles in a direction toward and in a direction away from the cutting tools. In this manner, the multi-axis lathe tool includes a machining compensation feature that limits contact between the enclosure feature and the cutting tools. As such, heat generation caused by constant engagement between the enclosure feature and the cutting tools is reduced or avoided, and temperature gradients created near the point of contact between the enclosure feature and the cutting tool is limited. This cutting operation can lead to less product deformation and accordingly, may lead to less waste. It will be appreciated, however, that the cutting tools may also be actuated in a direction away from and toward a rotating enclosure feature and the same results may be achieved.

Subsequent to the cutting processes, additional material removal processes remove undesirable features, such as cutting marks, from the enclosure feature to improve the contour and finish. For example, the sidewall may receive a grinding operation that not only removes the cutting marks but also reduces operating times in subsequent stations. For example, the operating time of a polishing station designed to polish the enclosure feature may be reduced.

In order to improve the co-planarity, or flatness, of the base portion, the enclosure feature may undergo a lapping process. The lapping process uses a fixture having several compliant features used to receive several enclosure features. The compliant features offer a machining compensation that allows for flexibility to account for some acceptable variations or tolerances among the enclosure features. Some lapping features and techniques that may be used are described and explained in U.S. Patent Publication 2014/0364038, to Lancaster-Larocque et al., and titled "CYLINDRICAL LAPPING", and U.S. Patent Publication 2013/0225050, to Chan et al., and titled "LOCALIZED SPOT LAPPING ON A LARGER WORK SURFACE AREA", the contents of each are incorporated herein by reference in their entirety.

The material removal process may further include several additional polishing operations. For example, several enclosure feature, and in particular the sidewalls of the enclosure features, can move along a track in order undergo one or more rough polishing operations. Then, a subsequent polishing station may include a compliant material (for example, cotton) to provide a fine polishing operation to both the sidewall and the curved regions. The fine polish may give the sidewall and the curved regions a relatively high reflectivity and aesthetic cosmetic finish. Also, the simultaneous fine polishing operation provides a continuous and consistent finish between the sidewall and the curved regions.

The enclosure features may further proceed to a linear brush station. The enclosure features may be secured to a special fixture similar to that of the fixture used by the multi-axis lathe tool. The linear brush station uses a sanding process that incorporates, for example, an abrasive sand paper moving along a belt. The fixture applies pressure to the enclosure features such that the base portions of the enclosure features are exposed to the sand paper. In this manner, an exterior region of the base portion includes a finish having several fine, linear-direction lines generally parallel with respect to each other. This process provides not only a second, different reflectivity than that of the reflectivity of the sidewalls and the curved regions, but also provides a distinct transition from the base portion to a curved region between the base portion and the sidewall.

These and other embodiments are discussed below with reference to FIGS. 1-26. However, those skilled in the art will readily appreciate that the detailed description given herein with respect to these Figures is for explanatory purposes only and should not be construed as limiting.

FIG. 1 illustrates an isometric view of an embodiment of an enclosure feature 100, in accordance with the described embodiments. In some embodiments, the enclosure feature 100 is formed from metal. For example, in some embodiments, the enclosure feature 100 is formed from stainless steel. In the embodiment shown in FIG. 1, the enclosure feature 100 is formed from stainless that includes a relatively high amount of nickel. Stainless steel may be used to provide a robust structure with an aesthetic cosmetic finish, while nickel may be used to improve the corrosion-resistance of the enclosure feature 100. Also, in some embodiments, the enclosure feature 100 includes an austenitic stainless steel such that the enclosure feature 100 is non-magnetic and, accordingly, is not attracted to a magnet. This reduces interference in applications in which the enclosure feature 100 is part of an induction charging station. Also, the enclosure feature 100 may be formed from a material removal process, such as subtractive manufacturing. This includes one or more cutting processes, which will be described below. As such, when the enclosure feature 100 is formed from dense metals, there may be relatively high heat generation due to friction, thereby causing a temperature gradient in certain locations of the enclosure feature 100 during production. Therefore, in some embodiments, the enclosure feature 100 is formed from non-work hardenable materials. In other words, in some embodiments, the enclosure feature 100 does not include materials that tend to harden or strengthen during a material removal process. Further, the material removal processes described herein may be designed to limit or prevent the material or materials used to form the enclosure feature 100 from hardening. While certain materials may be described, any metal material or materials that are non-magnetic, corrosion-resistant, and substantially non-work hardenable may generally be used to form the enclosure feature 100.

As shown in FIG. 1, the enclosure feature 100 may include a sidewall 102 integrally formed with a base portion 104, and an interior recess 106 defined by the sidewall 102 and the base portion 104. As shown, the sidewall 102 circumferentially surrounds the base portion 104. The interior recess 106 is generally a void or space in the enclosure feature 100 and formed from a material removal process.

Also, the interior recess 106 can be used to receive one or more electrical components (such as an electromagnet) to form an induction charging station (not shown). The sidewall 102 may include a support feature 108. In some embodiments, the support feature 108 is a ledge or generally horizontal surface that may be used to receive a component. For example, the component may be an electronic device support associated with an induction charging station.

The sidewall 102 may include several additional features. For example, the sidewall 102 may include an opening 112 that allows one or more features to extend through the enclosure feature 100. Also, the sidewall 102 may include a first curved region 114 and a second curved region 116. Both the first curved region 114 and the second curved region 116 may extend along opposing regions of the sidewall 102. The second curved region 116 may further define a transition region from the sidewall 102 to an exterior region (not shown) of the base portion 104. Also, as shown, the sidewall 102 includes a reflectivity substantially similar to that of the first curved region 114 and second curved region 116. This reflectivity is generally associated with a relatively shiny, high-polish finish. Also, during a material removal process, a single tool (not shown) may be used to cut both the first curved region 114 and the second curved region 116. Accordingly, the first curved region 114 includes a radius of curvature substantially similar to that of the second curved region 116.

Figure 2:
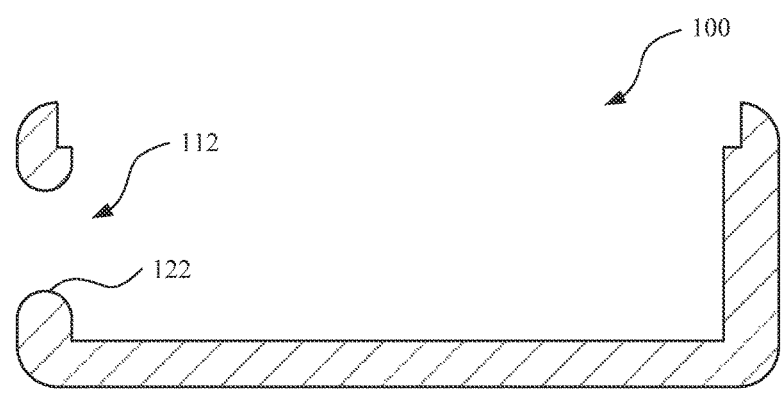
FIG. 2 illustrates a cross-sectional view of the enclosure feature shown in FIG. 1, taken along line A-A.

FIG. 2 illustrates a cross-sectional view of the enclosure feature 100 shown in FIG. 1, taken along line A-A. As shown, the opening 112 of the enclosure feature 100 may include chamfered region 122 that defines an outer perimeter of the opening 112. The chamfered region 122 is designed to provide the opening 112 to replace any sharp edge with a smooth and rounded edge. In this manner, when the opening 112 includes a structure sensitive to damage, such as a polymeric sheath of a cord assembly, the structure is less likely incur damage when contacting the opening 112 due in part to the opening 112 having a rounded edge.

Figure 3:
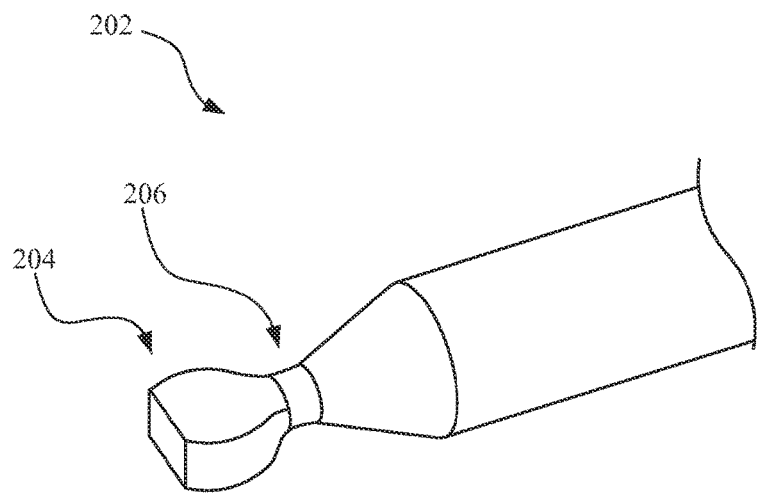
FIG. 3 illustrates an embodiment of a cutting tool used to form the chamfered region of the opening shown in FIGS. 1 and 2.

In order form the chamfered region 122, a cutting tool with a radius of curvature corresponding to the radius of curvature of the chamfered region 122 may be inserted into the opening 112 and used to perform a material removal process to the opening 112. FIG. 3 illustrates an embodiment of a cutting tool 202 used to form the chamfered region 122 of the opening 112 (shown in FIGS. 1 and 2). The cutting tool 202 includes an end region 204 smaller than a diameter of the opening 112. The cutting tool 202 is used subsequent to a material removal process used to form a rough cut for the opening 112. Also, the cutting tool 202 includes a cutting edge 206 having a radius of curvature substantially similar to that of the chamfered region 122. It will be appreciated that the cutting edge 206 may vary in order to form a desired radius of curvature of the chamfered region 122.

Figure 4:
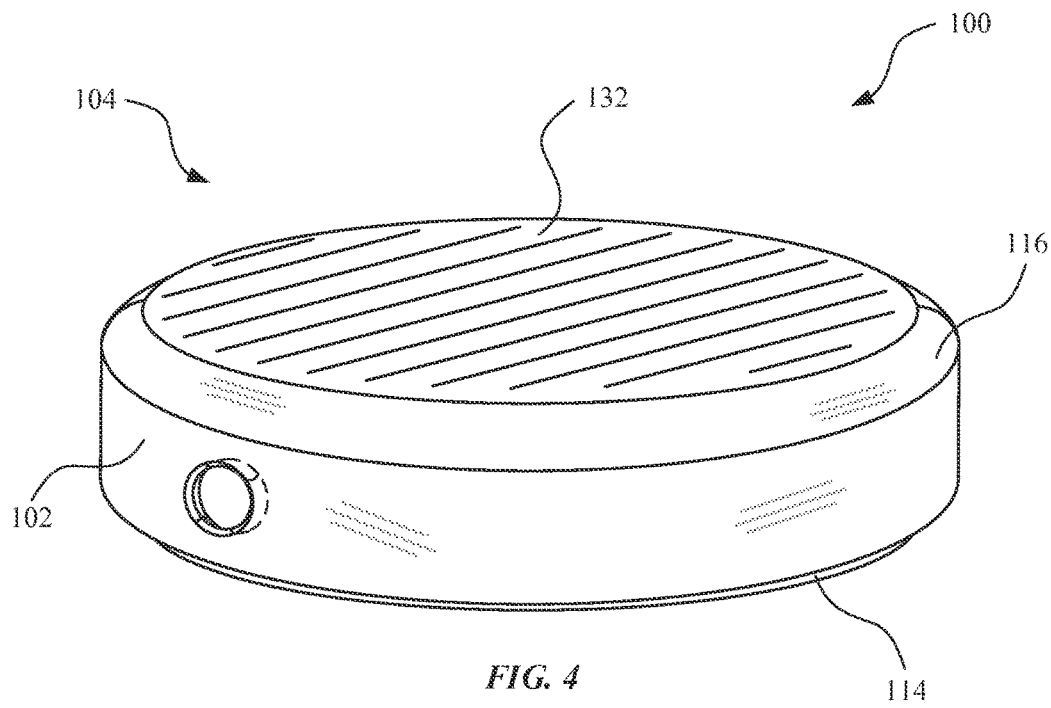
FIG. 4 illustrates an isometric view of the enclosure feature showing the base portion.

FIG. 4 illustrates an isometric view of the enclosure feature 100 showing an exterior region 132 of the base portion 104. As shown, the exterior region 132 may include a brushed finish formed by material removal process (described below). The brushed finish is generally associated with several fine, linear-direction lines generally parallel with respect to each other. Also, the exterior region 132 includes a reflectivity different that of the sidewall 102, the first curved region 114, and the second curved region 116. The reflectivity of the exterior region 132 is generally associated with a dull, non-gloss finish. Also, the exterior region 132 is designed to contact a surface (such as a desk) on which the enclosure feature 100 lies and may form an abrasive contact surface to limit lateral movement of the enclosure feature 100 with respect to the surface.

The following description and figures are associated with various material removal processes used to form an enclosure feature (such as the enclosure feature 100, shown in FIG. 1). The material removal process can include several machine-cutting techniques used to form the basic shape and design of the enclosure feature, as well as various lapping, sanding, and polishing techniques. The enclosure features shown and described may include any property or properties previously described for an enclosure feature.

Figure 5:
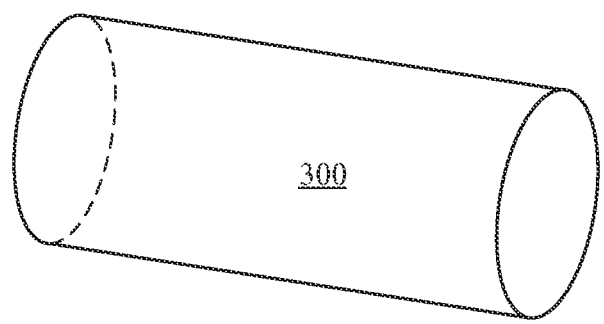
FIG. 5 illustrates an isometric view of an embodiment of a metal structure, in accordance with the described embodiments.

FIG. 5 illustrates an isometric view of an embodiment of a metal structure 300, in accordance with the described embodiments. The metal structure 300 is associated with a single, solid piece of material used to form an enclosure feature previously described. As shown, the metal structure 300 is in the form of a cylindrical metal ingot or substrate. In this regard, the metal structure 300 may be used to form several enclosure features. The cutting operations described below are designed to perform several material removal processes to the metal structure 300, including cutting away a partially processed enclosure feature from the metal structure 300.

Figure 6:
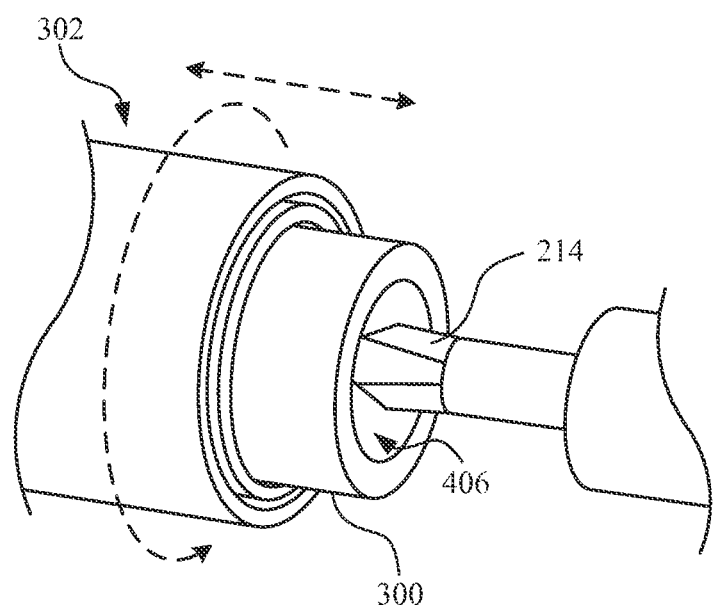
FIG. 6 illustrates an isometric view of the metal structure undergoing a material removal process to define an interior recess of an enclosure feature, in accordance with the described embodiments.

FIG. 6 illustrates an isometric view of the metal structure 300 undergoing a material removal process to define an interior recess 406 of an enclosure feature, in accordance with the described embodiments. A first spindle 302 of a multi-axis lathe tool (not shown) secures the metal structure 300 within the first spindle 302. As shown, the first spindle 302 rotates the metal structure 300 at relative high speeds, on the order of several thousand revolutions per minute ("RPM"). Also, the first spindle 302 is designed to actuate the metal structure 300 in a direction toward and away from a cutting tool 214 that remains stationary during the cutting process. Moreover, the actuation toward and away from the cutting tool 214 may be performed during the cutting process, similar to a "pecking" action indicative of a contact cycle of engagement and disengagement between the metal structure 300 and the cutting tool 214. For example, when the first spindle 302 actuates the metal structure 300 to engage the cutting tool 214 or a cutting surface of the metal structure 300, the cutting tool 214 performs a cutting operation to the metal structure 300. Further, when the first spindle 302 actuates the metal structure 300 away from the cutting tool 214, the metal structure 300, and in particular, the cutting surface of the metal structure, is allowed to dissipate heat (generated by the cutting action of the cutting tool 214) and cool the metal structure 300. Also, the cutting tool 214 is allowed to dissipate heat and cool. In this manner, the contact between the metal structure 300 and the cutting tool 214 is minimized and heat build-up in the metal structure 300 is reduced. This reduces undesirable attributes such as thermal gradients across the metal structure 300 and/or the cutting tool 214, as well as heat deformation to the metal structure 300. Also, management of chip removal is improved which may lead to decreased machining times. Also, it will be appreciated that prior to cutting to form the interior recess 406, there may be cutting process to remove an exterior, circumferential surface of the metal structure 300 to obtain a desired diameter and/or to remove any defects associated with the exterior, cylindrical surface of the metal structure 300.

Further, the multi-axis lathe tool may further include one or more temperature sensors monitoring the temperature during the cutting operation. The temperature sensors may provide an input to a controller. The controller may increase or decrease a frequency of the contact cycle based upon the input from the temperature sensors. This may increase the efficiency of the operation by changing the cutting operation according to real-time temperature monitoring, and may also increase the life of the cutting tool 214 by reduces heat-related stresses to the cutting tool 214.

Figure 7:
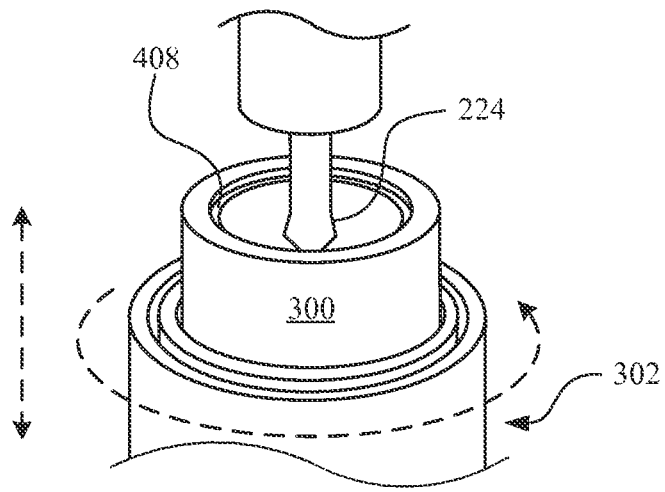
FIG. 7 illustrates an isometric view of the metal structure undergoing a material removal process to define a support feature, in accordance with the described embodiments.

FIG. 7 illustrates an isometric view of the metal structure 300 undergoing a material removal process to define a support feature 408, in accordance with the described embodiments. The support feature 408 may be akin to a support feature 108 (shown in FIG. 1). Again, the first spindle 302 is capable of actuating the metal structure 300 with respect to the cutting tool 224 in a manner previously described for actuating the metal structure 300 with respect to the cutting tool 214 (shown in FIG. 6).

Figure 8:
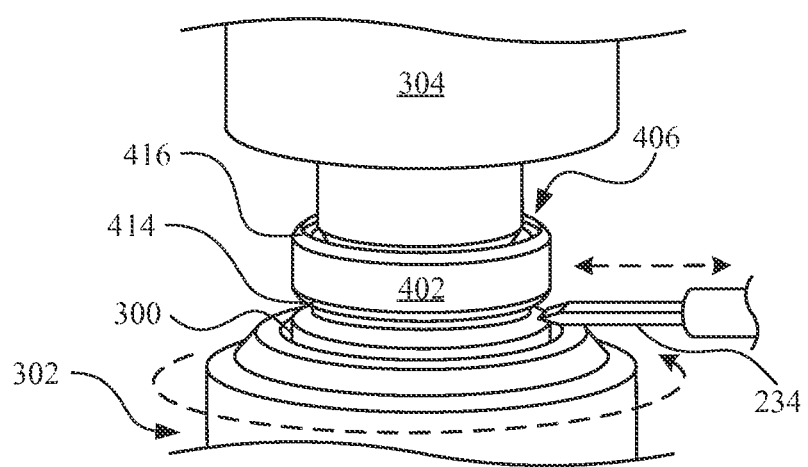
FIG. 8 illustrates an isometric view of a material removal process to remove a portion of the metal structure and a second spindle engaging the interior recess, in accordance with the described embodiments.

FIG. 8 illustrates an isometric view of a material removal process to remove a portion of the metal structure 300 and a second spindle 304 engaging the interior recess 406 of the enclosure feature 400, in accordance with the described embodiments. As shown, a cutting tool 234 may be actuated in a direction toward and away from the metal structure 300. Further, the cutting tool provides a cutting action that removes an enclosure feature 400 (partially formed) from the metal structure 300. Also, the second spindle 304 includes a fixture (not shown) designed to secure the enclosure feature 400 with the second spindle 304. In this manner, when the enclosure feature 400 is cut away from the metal structure 300, the second spindle 304 carries the enclosure feature 400 away from the first spindle 302 and to the next area of the multi-axis lathe tool (not shown) to perform a subsequent cutting action. Also, the first spindle 302 can begin using a remaining portion of the metal structure 300 to form a subsequent enclosure feature. This continuous process described reduces manufacturing process, which leads to higher throughput of an enclosure feature.

Several cutting steps (not shown) may be performed prior to cutting a portion of the metal structure 300. For example, one or more cutting processes may be used to form a first curved region 414 and a second curved region 416.

Figure 9:
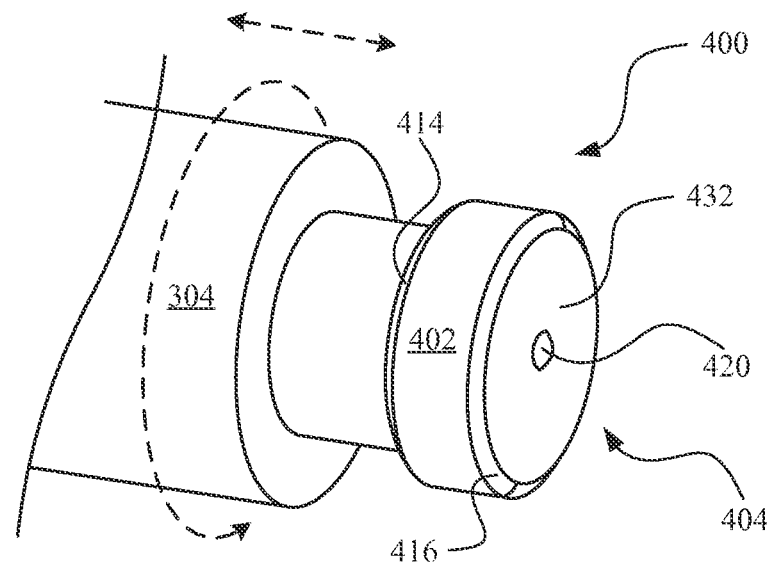
FIG. 9 illustrates an isometric view of the enclosure feature secured with the second spindle, in accordance with the described embodiments.

FIG. 9 illustrates an isometric view of the enclosure feature 400 secured with the second spindle 304, in accordance with the described embodiments. In this configuration, exterior features of the enclosure feature 400 and additional cutting process may be performed. Further, any residual effects from the cutting tool 234 (shown in FIG. 8), such as a protrusion 420 located on an exterior region 432 of the base portion 404, can be removed. Also, in some embodiments, a single cutting tool (not shown) can be used to perform a cutting operation along the first curved region 414, the sidewall 402, the second curved region 416, and exterior region 432. This allows for a continuous, uninterrupted finish along the aforementioned sections as multiple cutting tools with associated various radii of curvature and associated tolerances are avoided.

Figure 10:
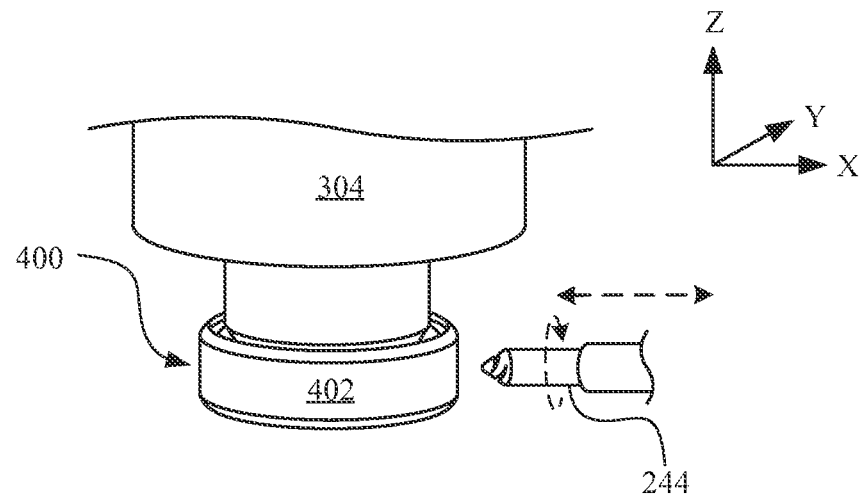
FIG. 10 illustrates an isometric view of a cutting tool used to form an opening in the sidewall, in accordance with the described embodiments.

FIG. 10 illustrates an isometric view of a cutting tool used to form an opening in the sidewall 402, in accordance with the described embodiments. As shown, the second spindle 304 orients the enclosure feature 400 such that the sidewall 402 receives a rough cut from the cutting tool 244. Subsequent to the rough cut, the second spindle 304 can actuate the enclosure feature 400 to an additional cutting tool (such as the cutting tool 202, shown in FIG. 3) in the multi-axis lathe tool. The additional cutting tool can be used to form a chamfered region of the opening (such as the chamfered region 122 shown in FIG. 2).

Also, during the cutting operation used to form the chamfered region, the second spindle 304 is capable of movement in circular motion in a Y-Z plane. As such, a cutting tool, such as the cutting tool 202, enters along the X-axis and enters the rough cut opening (not shown). The cutting tool 202 may rotate about a longitudinal axis extending through the cutting tool 202 while the enclosure feature 400, actuated by the second spindle 304, moves along a circular path in accordance with the circular motion in the Y-Z plane.

Although the various cutting techniques are designed to reduce heat build-up in an enclosure feature, frictional forces may nonetheless create some heat and deformation may occur. However, certain techniques may be used to reduce and offset the deformation.

Figure 11:
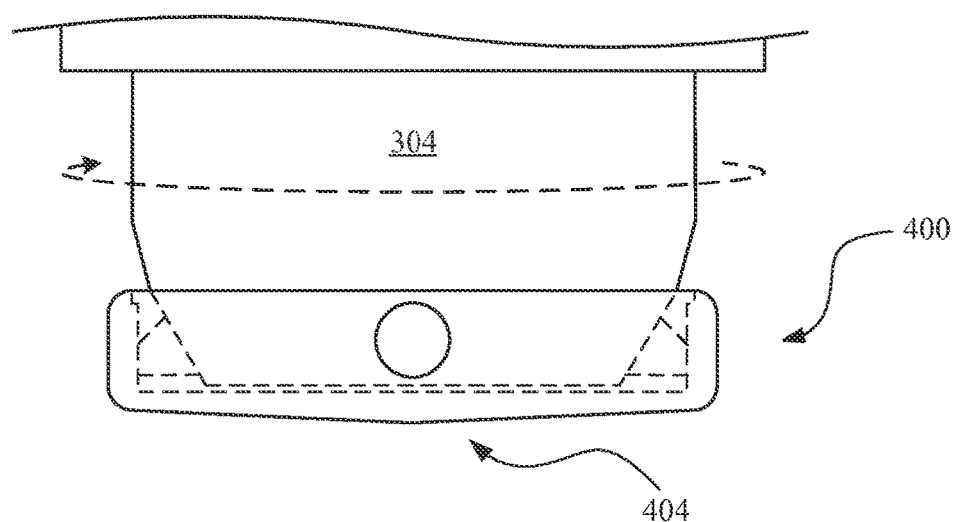
FIG. 11 illustrates a side view of the enclosure feature secured with the second spindle, showing the enclosure feature having a base portion that is bowed due in part to the material removal processes.
Figure 12:
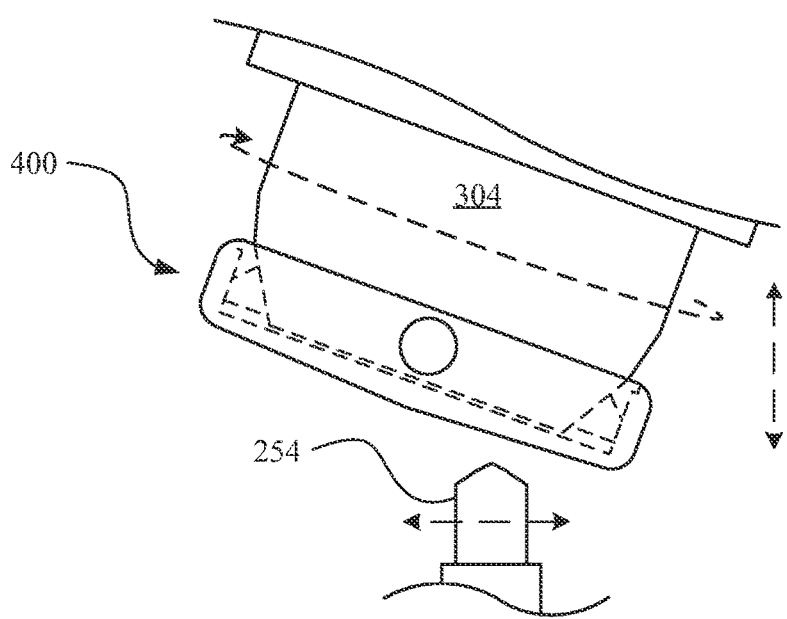
FIG. 12 illustrates a side view of the second spindle and the enclosure feature shown in FIG. 11, showing the second spindle positioning the enclosure feature at an angle with respect to a cutting tool.

FIG. 11 illustrates a side view of the enclosure feature 400 secured with the second spindle 304, showing the enclosure feature 400 having a base portion 404 deformed or bowed due from a material removal processes previously described. FIG. 12 illustrates a side view of the second spindle 304 and the enclosure feature 400 shown in FIG. 11, showing the second spindle 304 positioning the enclosure feature 400 at an angle with respect to a cutting tool 254. As shown, the second spindle 304 is a capable of actuating the enclosure feature 400 in a direction toward and away from the cutting tool 254. In some embodiments, the second spindle 304 actuates the enclosure feature 400 horizontally with respect to the cutting tool 254. In the embodiments shown in FIG. 12, the cutting tool 254 actuates horizontally with respect to the enclosure feature 400.

Figure 13:
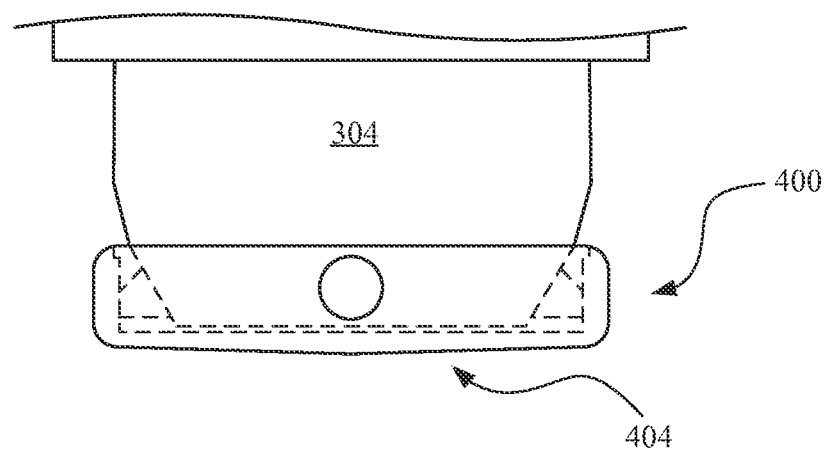
FIG. 13 illustrates a side view of the second spindle and the enclosure feature after a material removal process by the cutting tool shown in FIG. 12.
Figure 14:
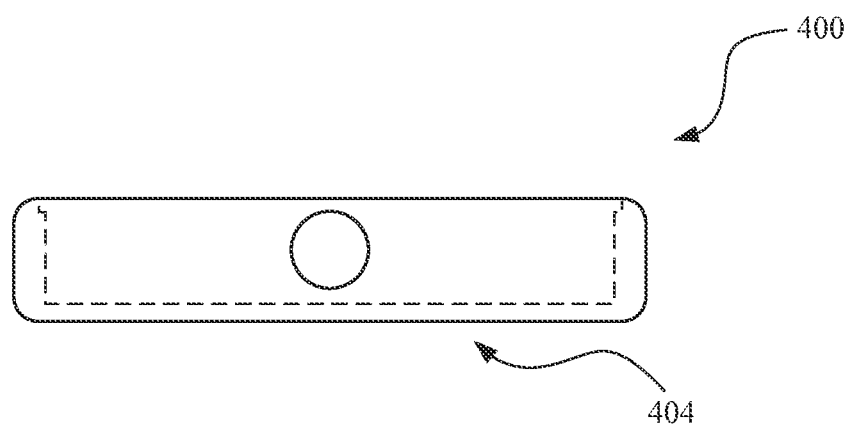
FIG. 14 illustrates a side view of the enclosure feature having undergone the material removal process shown in FIG. 12.

When the enclosure feature 400 engages the cutting tool 254, at least a portion of the deformed region of the base portion 404 is cut away from the base portion 404. FIG. 13 illustrates a side view of the second spindle 304 and the enclosure feature 400 after a material removal process by the cutting tool 254 (shown in FIG. 12). While some deformation is present, the material removal process forms a base portion 404 substantially flat after the various stresses (heat build-up and securing/clamping with the second spindle 304) are removed. FIG. 14 illustrates a side view of the enclosure feature 400 having undergone the material removal process shown in FIG. 12. As shown, once heat is dissipated and the second spindle 304 is removed, the base portion 404 is substantially flat.

Figure 15:
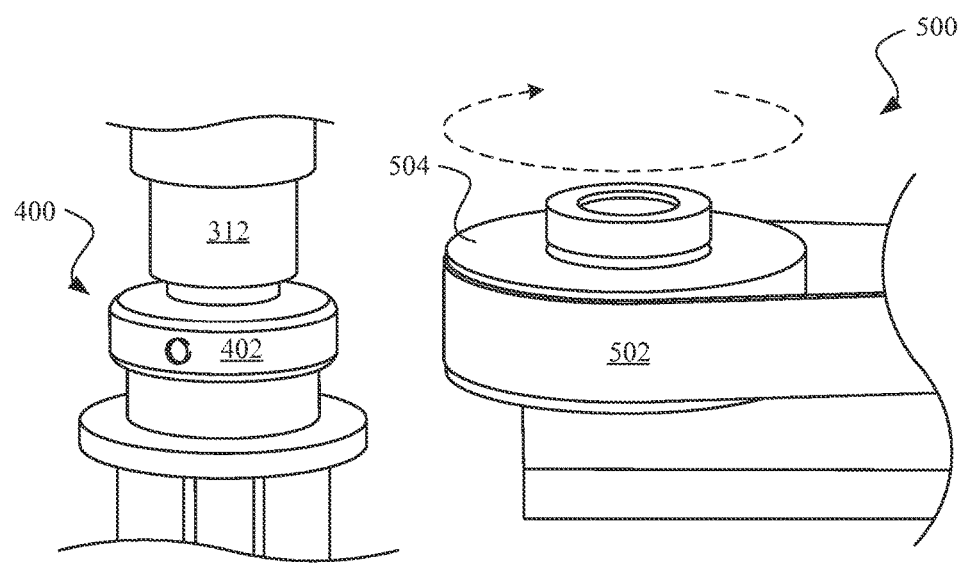
FIG. 15 illustrates a view of a system used to perform a material removal process to remove a portion of the sidewall of the enclosure feature, in accordance with the described embodiments.

Subsequent to the cutting processes previously described, additional material processes may be performed. For example, FIG. 15 illustrates a view of a grinding system 500 used to perform a material removal process to remove a portion of the sidewall 402 of the enclosure feature 400, in accordance with the described embodiments. In some embodiments, the grinding system 500 is a rotary tool that rotates a grit material 502 (such as sand paper) along a wheel 504 to remove material from the sidewall 402. The enclosure feature 400 may be engaged with an actuator 312 designed to rotate the enclosure feature 400 during the material removal process. The sidewall 402 may include several cut marks or other minor defects from the cutting operations that may be substantially, or in some cases, completely removed from the sidewall 402. Also, the grinding system 500 can be used to remove material from the enclosure feature 400 such that the sidewall 402 is substantially straight or vertical. This ensures a consistent finish of a product produced in mass quantities. Also, although FIG. 15 generally shows a setup for an enclosure feature 400, the grinding system 500 may be used inline with a mass production line used to remove material from several enclosure features.

Figure 16:
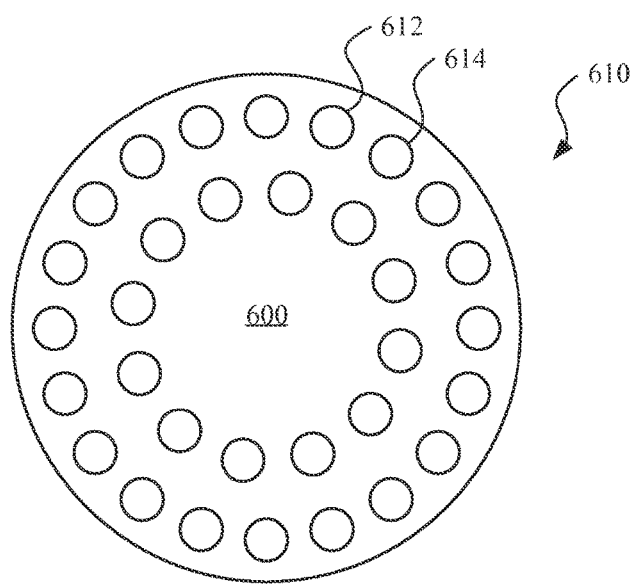
FIG. 16 illustrates a plan view of a fixture designed to secure several enclosure features such that the several enclosure features can undergo a lapping process to the respective base portions of the enclosure features.

After the sidewall grinding described above, a base portion may undergo a material removal process. FIG. 16 illustrates a plan view of a fixture 600 designed to secure several enclosure features such that the several enclosure features can undergo a lapping process to the respective base portions of the enclosure features. The fixture 600 may include compliant features 610 used to secure several enclosure features. For example, the compliant features 610 may include a first compliant feature 612 and a second compliant feature 614. Each of the compliant features 610 of the fixture 600 is designed to engage an interior recess (such as interior recess 106 shown in FIG. 1) of an enclosure feature. The compliant features 610 include a cushion in order to offset, or "absorb", any tolerances of the enclosure features such that each of the base portions engages a lapping table used in the lapping process. When each of the compliant features 610 is loaded with an enclosure feature, the fixture 600 is disposed on a lapping table. A lapping process can include includes small, abrasive particles positioned between the lapping table and one or more parts. Both the lapping table and the one or more parts are rotated, and the base portions contact the abrasive particles to provide a material removal process to the base portions. In this manner, a base portion (such as the base portion 104 shown in FIG. 4) includes improved co-planarity, or flatness, due in part to the lapping process. Some lapping features and techniques may be used are described and explained in U.S. Patent Publication 2014/0364038, to Lancaster-Larocque et al., and titled "CYLINDRICAL LAPPING," and U.S. Patent Publication 2013/0225050, to Chan et al., and titled "LOCALIZED SPOT LAPPING ON A LARGER WORK SURFACE AREA," the contents of each are incorporated herein by reference in their entirety.

Figure 17:
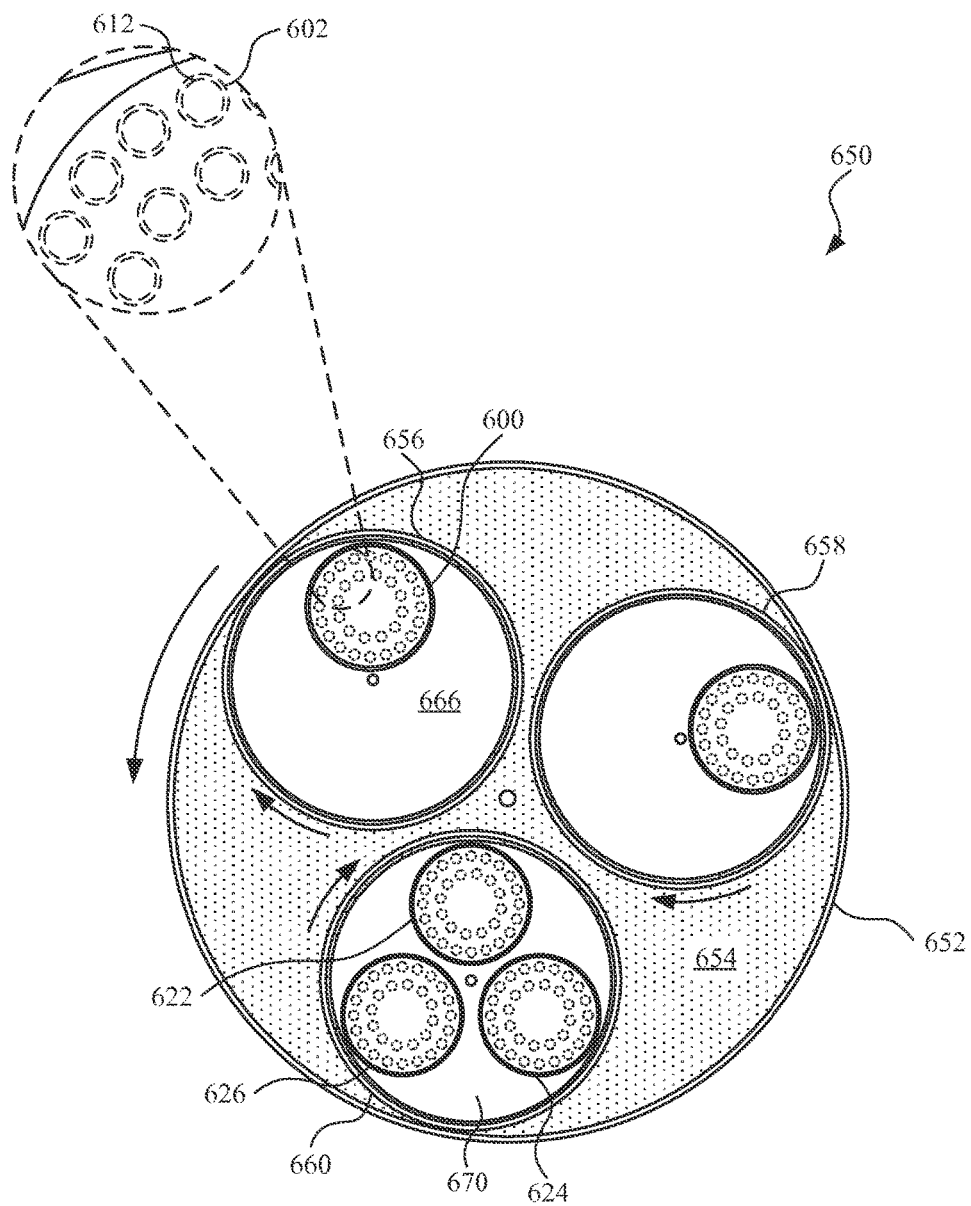
FIG. 17 illustrates a top view of an embodiment of a tapping table designed to receive several fixtures similar to the fixture shown in FIG. 16.

FIG. 17 illustrates a top view of exemplary embodiment of a lapping table 650 designed to receive several fixtures similar to the fixture 600 shown in FIG. 16. Subsequent to one or more cutting and grinding operations to a surface of enclosure feature, the lapping table 650 may be used to perform a lapping operation to the enclosure in order to improve the surface finish of, for example, an exterior region 132 (shown in FIG. 4) of an enclosure feature. This may improve the planarity of the exterior region and/or removing cutting marks left by a prior cutting operation.

The lapping table 650 may include a disc 652. The abrasive disc 652 may be coupled to a rotational mechanism (e.g., a motor) designed to rotate the abrasive disc 652 at various speeds about an axis extending through a center of the disc 652. As shown, the disc 652 may rotate in a counterclockwise manner. However, in other embodiments, the rotational mechanism rotates the disc 652 in a clockwise manner. The rotational speed of the disc 652 may be selected based upon the type of surface finish that is desired from the lapping operation, amongst other factors. For example, an enclosure feature having undergone a substantially material removal operation may only require a relatively low material removal operation from the lapping table 650, and accordingly, the rotational speed of the disc 652 may be relatively slow.

The disc 652 may include an abrasive surface 654. In some embodiments, the abrasive surface 654 includes several small particles that engage a structure, such as an enclosure feature (previously described), to perform a material removal operation a surface the structure. For example, the particles of the abrasive surface 654 may be positioned between the disc 652 and several enclosure features coupled with a fixture, such as the fixture 600 (also described in FIG. 16).

The lapping table 650 may additionally include one or more conditioning rings. As shown, the lapping table includes a first conditioning ring 656, a second conditioning ring 658, and a third conditioning ring 660. However, the number of conditioning rings may vary. Each conditioning ring may include a retaining feature coupled with the conditioning ring, with each retaining feature designed to receive a fixture. As shown in FIG. 17, the first conditioning ring 656 may include a first retaining feature 666 designed receive the fixture 600. However, the retaining features may be designed to receive several fixtures. For example, the third conditioning ring 670 may include a retaining feature 670 designed to receive a first fixture 622, a second fixture 624, and a third fixture 626 (with these fixture being substantially similar to that of the fixture 600). This may allow the lapping table 650 to increase the throughput of the lapping operation.

Each fixture shown in FIG. 17 may include several compliant features (previously described) that may receive an enclosure feature in a manner such that an exterior region (such as the exterior region 132 shown in FIG. 4) engages the abrasive surface 654. For example, enlarged view shows the first compliant feature 612 securing a first enclosure feature 602 secured with the first compliant feature 612 such that an exterior region of the first enclosure feature faces the abrasive surface 654. Also, the second conditioning ring 658 and the third conditioning ring 660 may include a fixture (or fixtures) substantially similar to the fixture 600, with each fixture having several compliant features loaded with a fixture to undergo a lapping operation.

The conditioning rings may include one or more attachment mechanisms for coupling one or more fixtures along an inside surface of a conditioning ring such that the fixtures are retained. In this regard, a center portion of the conditioning rings may be hollow as illustrated, and the attachment mechanisms may engage the fixtures such that fixture are held with the attachment mechanisms.

When each fixture is loaded with several enclosure features and positioned in a retaining feature, the enclosure features may be disposed over the abrasive surface 654. During operation, the disc 652 may rotate in a direction opposite the direction of the conditional rings. For example, as shown, the disc 652 may rotate in a counterclockwise direction, while the first condition ring 656, the second conditioning ring 658, and the third condition ring 660 may rotate in a clockwise direction. The rotational motion of the disc 652, which carries the abrasive surface 654, combined with the opposing rotational motion of the conditioning rings, which carry and rotate the fixtures, may create additional frictional threes between the enclosure features and the abrasive surface 654. This may increase the efficiency of the lapping operation and decreasing the lapping operation times. Also, although not shown, one or more plates may be disposed over each of the retaining features. The plates may provide an additional force to the fixtures, which may cause an additional frictional force between the enclosure features and the abrasive surface 654.

Figure 18:
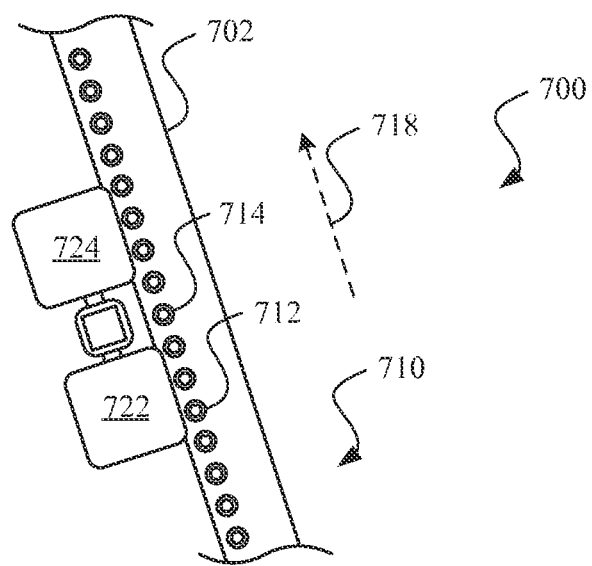
FIG. 18 illustrates a plan view of a polishing station used to perform a polishing operation to several enclosure features, in accordance with the described embodiments.

In order form an enclosure feature with a relatively high reflectivity, the enclosure feature may undergo several polishing operations. For example, FIG. 18 illustrates a plan view of a first polishing station 700 used to perform a polishing operation to several enclosure features, in accordance with the described embodiments. Generally, the first polishing station 700 is designed to give a rough polish and condition the enclosure features for subsequent polishing operations. As shown, the first polishing station 700 is positioned near a track 702 having several fixtures 710, such as a first fixture 712 and a second fixture 714, capable of receive an enclosure feature previously described. The several fixtures 710 move along the track 702 in the direction of the arrow 718, and may move onto one or more polishing stations similar to the polishing station shown in FIG. 18.

Figure 19:
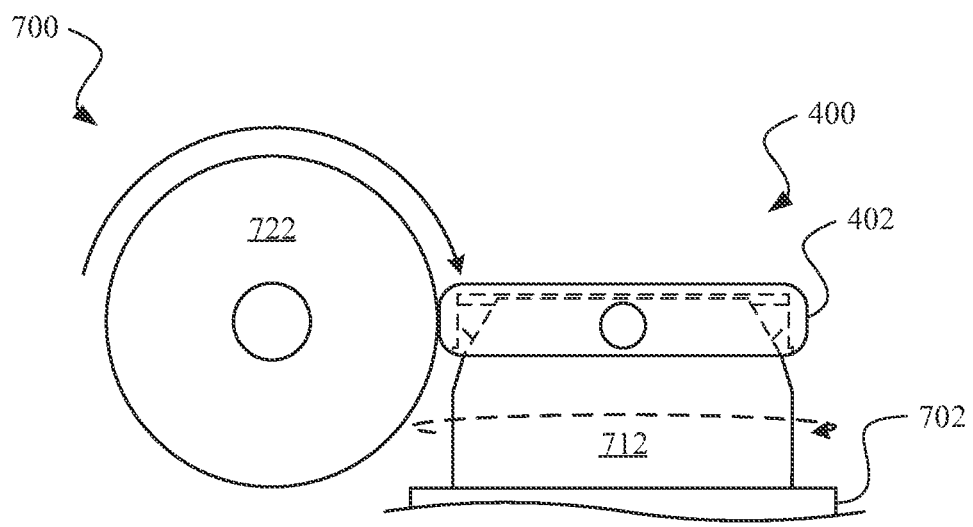
FIG. 19 illustrates a side view of the polishing station shown in FIG. 18, showing a first polishing tool engaging the sidewall of the enclosure feature.

As shown, the first polishing station 700 includes a first polishing tool 722 and a second polishing tool 724. In some embodiments, the first polishing tool 722 and the second polishing tool 724 are designed to rotate in a direction perpendicular with respect to the direction of the arrow 718. For example, FIG. 19 illustrates a side view of the first polishing station 700 shown in FIG. 18, showing the first polishing tool 722 engaging the sidewall 402 of the enclosure feature 400. The first fixture 712 may rotate the enclosure feature 400 while the first polishing tool 722 rotates in a clockwise direction. As the enclosure feature 400 travels along the track 702 "into the page" (in view of the direction of the arrow 718, shown in FIG. 17), the clockwise rotation of the first polishing tool 722 is generally perpendicular with respect to the direction of travel of the enclosure feature 400.

Figure 20:
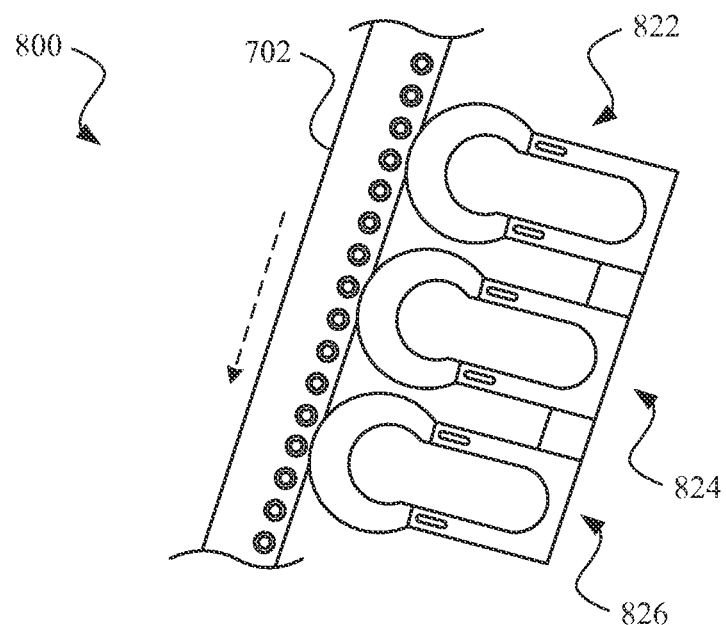
FIG. 20 illustrates a plan view of a second polishing station used to perform an additional polishing operation to a sidewall, a first curved region, and a second curved region of an enclosure feature, in accordance with the described embodiments.

FIG. 20 illustrates a plan view of a second polishing station 800 used to perform an additional polishing operation to a sidewall, a first curved region, and a second curved region of an enclosure feature, in accordance with the described embodiments. The second polishing station 800 is designed to be a fine polish associated with a high reflectivity. Accordingly, in some cases, the second polishing station 800 can be the final polishing step.

As shown, the second polishing station 800, like the first polishing station 700 (shown in FIG. 18), may be positioned near the track 702 that delivers several enclosure features from the first polishing station 700. The second polishing station 800 may include a first polishing tool 822, a second polishing tool 824, and a third polishing tool 826. In some embodiments, the first polishing tool 822, the second polishing tool 824, and the third polishing tool 826 include a cotton material. The first polishing tool 822, the second polishing tool 824, and the third polishing tool 826 are designed to include compliant material such that a sidewall and multiple curves regions of an enclosure feature deform the aforementioned polishing tools and receive a polishing operation from each of the polishing tools of the second polishing station 800.

Figure 21:
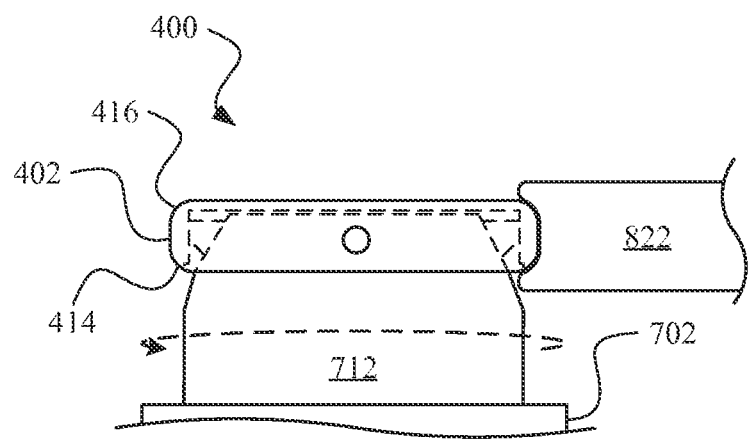
FIG. 21 illustrates a side view of the first polishing tool (shown in FIG. 20) engaging the sidewall, the first curved region, and the second curved region.

In this manner, FIG. 21 illustrates a side view of the first polishing tool 822 (shown in FIG. 20) engaging the sidewall 402, the first curved region 414, and the second curved region 416 of the enclosure feature 400. This allows for a continuous and consistent polishing finish of the sidewall 402, the first curved region 414, and the second curved region 416. As shown, the first fixture 712 can rotate the enclosure feature 400 while engaged with the first polishing tool 822. In other embodiments, the first polishing tool 822 rotates, either alternatively or in combination, with respect to the enclosure feature 400 and the first fixture 712.

Figure 22:
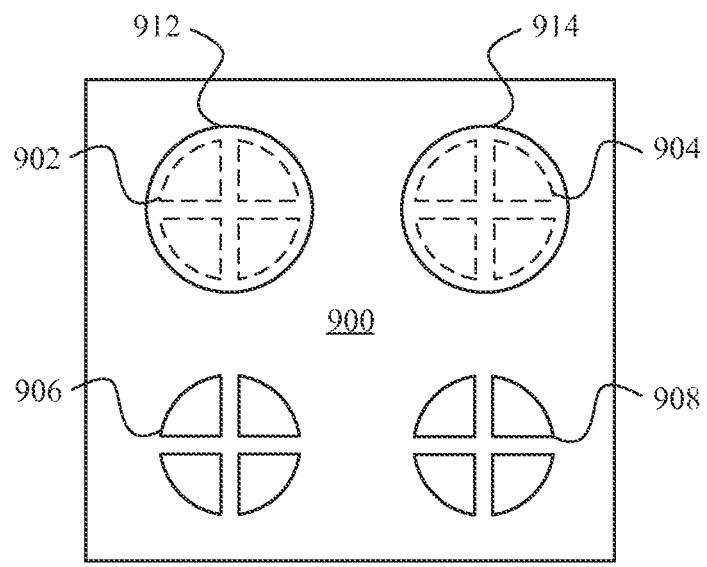
FIG. 22 illustrates a side view of a brushing tool performing a linear brushing operation to the first enclosure feature and the second enclosure feature, in accordance with the described embodiments.

FIG. 22 illustrates a plan view of a fixture 900 used to secure several enclosure features to perform a linear brushing operation to the base portion of the enclosure feature, in accordance with the described embodiments. The fixture 900 includes a first fixture element 902, a second fixture element 904, a third fixture element 906, and a fourth fixture element 908. However, in other embodiments, the fixture 900 includes five or more fixture elements. Also, as shown, the first fixture element 902 includes a first enclosure feature 912 and the second fixture element 904 includes a second enclosure feature 914. The fixture 900 is designed to maintain the enclosure features in a stationary position while a linear brush operation engages the base portions of the enclosure features, and in particular, the exterior regions (of the base portions).

Figure 23:
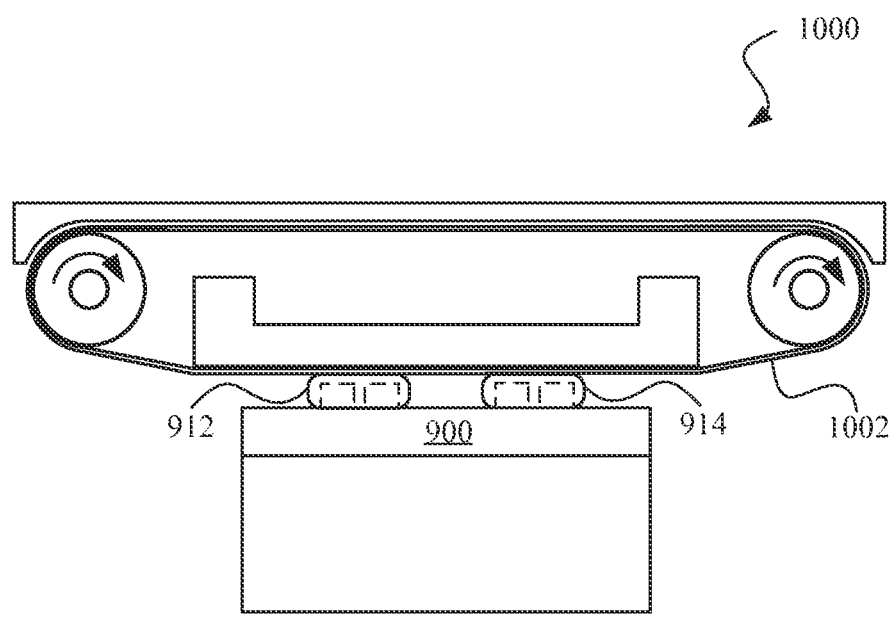
FIG. 23 illustrates a side view of a brushing tool performing a linear brushing operation several enclosure featured secured with the fixture shown in FIG. 22.

FIG. 23 illustrates a side view of a brushing tool 1000 performing a linear brushing operation to the first enclosure feature 912 and the second enclosure feature 914. The first enclosure feature 912 and the second enclosure feature 914 are with the fixture 900. In some embodiments, the brushing tool 1000 is a belt grinder that includes a grit material 1002 such as sand paper. In some embodiments, the grit material 1002 is high-grit sandpaper material formed from an aluminum oxide. The brushing tool 1000 allows for an enclosure feature, such as the first enclosure feature 912 and the second enclosure feature 914, to include an exterior region having several fine, linear-direction lines generally parallel with respect to each other (see, for example, the exterior region 132 shown in FIG. 4).

Figure 24:
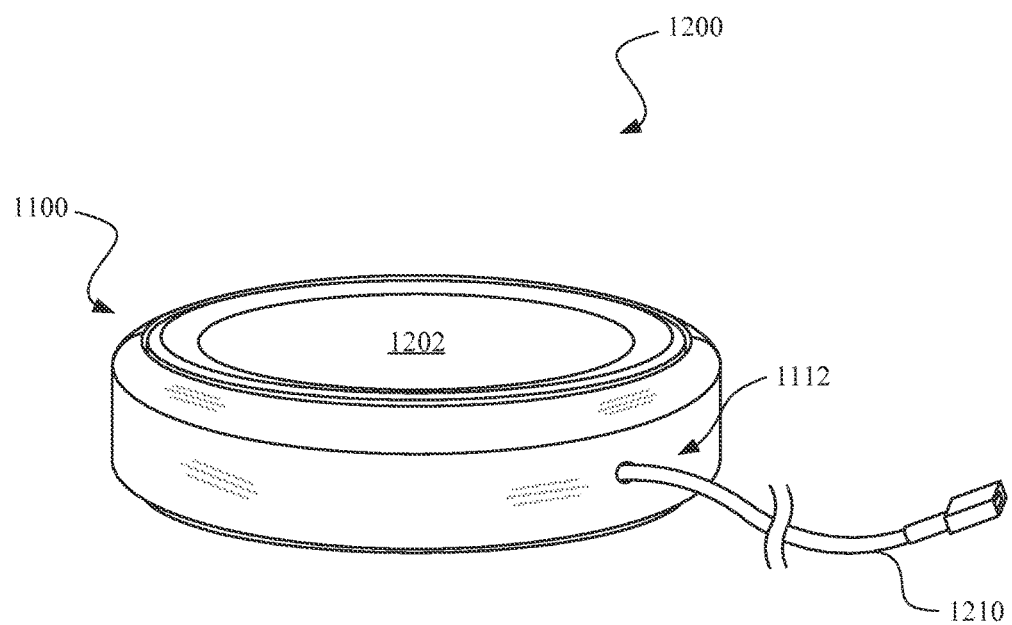
FIG. 24 illustrates an isometric view an embodiment of an enclosure feature used to enclose several electrical components that define an inductive charging station, in accordance with the described embodiments.

FIG. 24 illustrates an isometric view an embodiment of an enclosure feature 1100 used to enclose several electrical components that define an inductive charging station 1200, in accordance with the described embodiments. The inductive charging station 1200 may be used to provide electrical current to an electronic device by inductive power transmission. In this regard, the inductive charging station 1200 may include an inductive coil, or inductive transmitter coil, wrapped around a metal core (iron core, for example) and designed to pair (or inductively couple) with a an inductive coil, or inductive receiver coil, in the electronic device. When the inductive transmitter coil receives an electrical current in the form of an alternating current, the inductive transmitter coil may induce a voltage, via the metal core, in the inductive receiver coil and charge a battery in the electronic device.

The inductive charging station 1200 may include a support surface 1202 that receives an electronic device (not shown) to be charged via induction charging free of a wired connection between the inductive charging station 1200 and the electronic device to be charged. In some embodiments, the support surface 1202 is formed from a polymeric material, such as plastic. However, the support surface 1202 may be formed from any electromagnetically or radio frequency ("RF") transparent material that allows for an inductive coupling between the inductive charging station 1200 and an electronic device. The support surface 1202 may combine with the enclosure feature 1100 to enclose an inductive coil (not shown) wrapped around a metal core (not shown). In this manner, when the inductive charging station 1200 is inductively coupled with an electronic device, the support surface 1202 allows an electrical current to flow from the inductive coil and the metal core in the inductive charging station 1200 through the support surface 1202, and to an inductive coil (not shown) in the electronic device designed to provide the electrical current to a battery in an electronic device. The aforementioned inductive coils may be magnetically coupled by, for example, a magnetic attachment disposed in the inductive charging station 1200. However, the enclosure feature 1100 may be formed from one or more non-magnetic materials such that the enclosure feature 1100 does not alter the magnetic coupling between the inductive coils. Further, the enclosure feature 1100 may be an RF-opaque feature that does not allow passing of radio frequencies in the form of electromagnetic waves.

The support surface 1202 may be disposed on, and adhesively secured with, a support feature (such as the support feature 108 shown in FIG. 1). In order to receive the electrical current, the enclosure feature 1100 can include an opening 1112 that allows a cable assembly 1210 to extend through the opening 1112. In some embodiments, the opening 1112 includes a chamfered region designed to provide a smooth surface that reduces the likelihood of causing damage to the cable assembly 1210. The cable assembly 1210 may include a connector 1212. The connector 1212 may include a universal serial bus ("USB") connector designed to electrically couple with a power source (not shown). The power source may take the form of a battery disposed in an electronic device such as a laptop. Alternatively, the power source may take the form of a plug having a corresponding pin assembly to receive the connector 1212. In this manner, the inductive charging station 1200 may receive an electrical current to charge an electronic device disposed on the support surface 1202. It will be appreciated that the enclosure feature 1100 may undergo any material removal process previously described for an enclosure feature. In this manner, the enclosure feature 1100 may be formed from a metal, such as stainless steel and/or nickel. However, in other embodiments, the enclosure feature 1100 is formed from a polymeric material, such as plastic.

Figure 25:
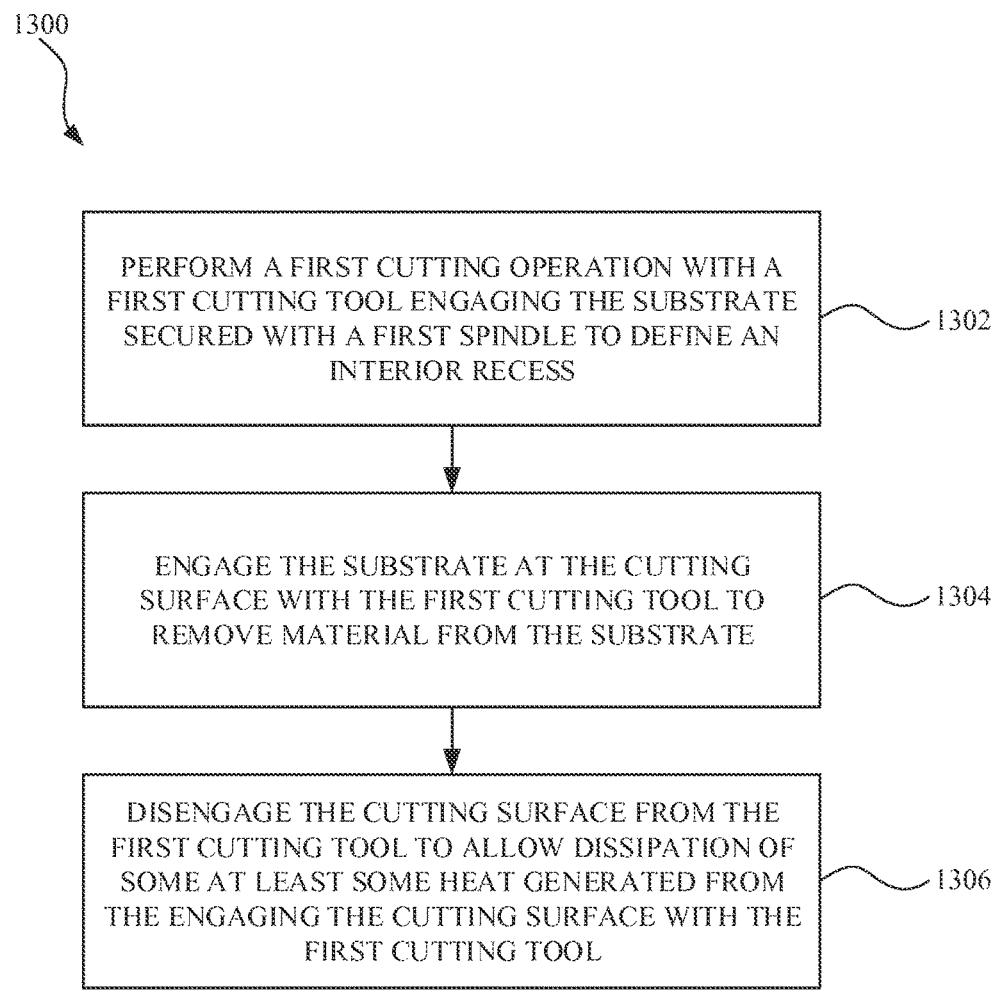
FIG. 25 illustrates a flowchart showing a method for forming an enclosure feature suitable for use with an electrical charging device.

FIG. 25 illustrates a flowchart 1300 showing a cutting and machining method lathe tool having multiple spindles, each of which is configured to secure a substrate, is shown. The cutting and machining method may be applied to a substrate in order to form an enclosure feature, or several enclosure features. In step 1302, a first cutting operation is performed on the substrate with the first cutting tool engaging the substrate that is secured with a first spindle in the multi-axis lathe tool to define an interior recess. The first cutting operation may include a contact cycle of repeatedly engaging and disengaging the substrate.

In step 1304, the substrate is engaged at the cutting surface with the first cutting tool. While the substrate is rotated by the first spindle, the first cutting tool removes material from the substrate.

In step 1306, the cutting surface is disengaged from the first cutting tool to allow dissipation of at least some heat generated from the engaging the cutting surface with the first cutting tool. This allows the substrate and the first cutting tool to cool during the first cutting operation in order to improve the first cutting operation an increase the lifespan of the first cutting tool.

Figure 26:
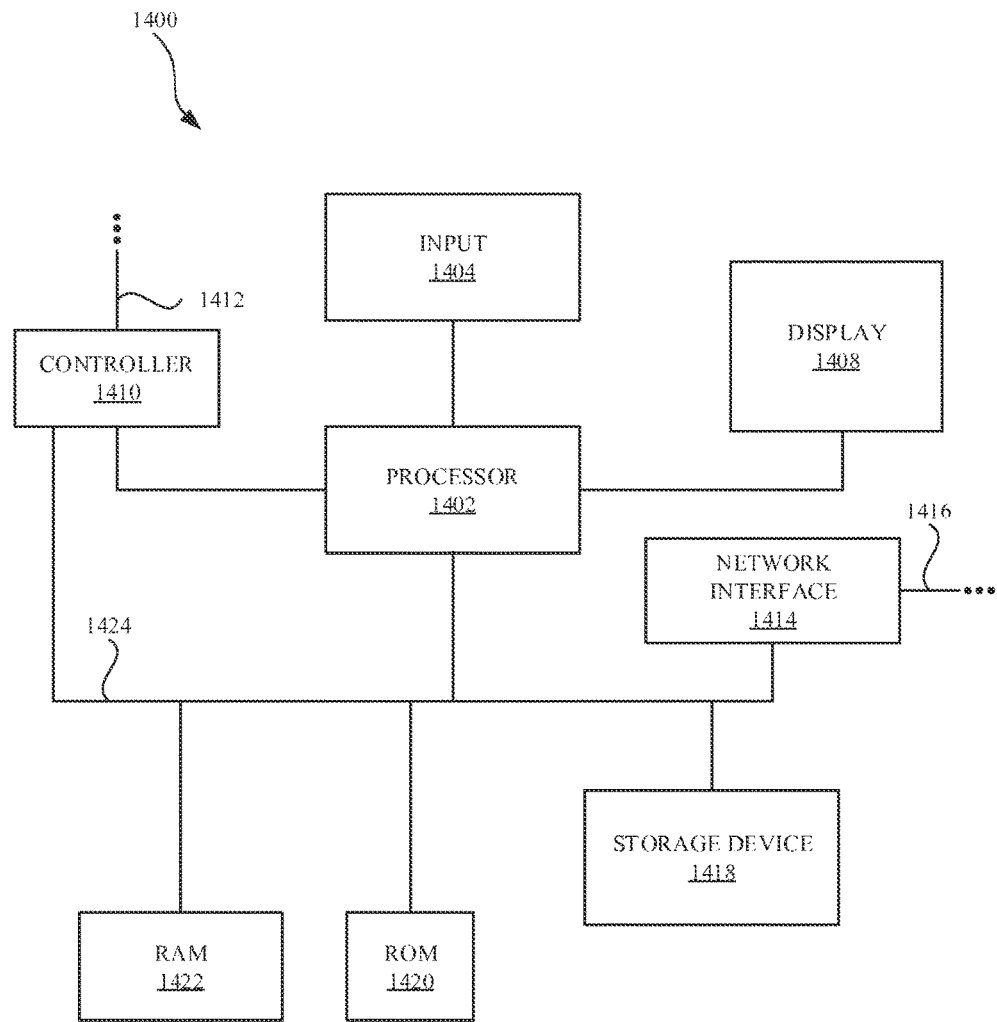
FIG. 26 illustrates a block diagram of a computing device that can represent the components of a computing device or any other suitable device or component for realizing any of the methods, systems, apparatus, and embodiments discussed herein.

FIG. 26 is a block diagram of a computing device 1400 that can represent the components of a computing device 1400 or any other suitable device or component for realizing any of the methods, systems, apparatus, and embodiments discussed herein. It will be appreciated that the components, devices or elements illustrated in and described with respect to FIG. 26 may not be mandatory and thus some may be omitted in certain embodiments. The computing device 1400 can include a processor 1402 that represents a microprocessor, a coprocessor, circuitry and/or a controller for controlling the overall operation of computing device 1400. Although illustrated as a single processor, it can be appreciated that the processor 1402 can include multiple processors. The multiple processors can be in operative communication with each other and can be collectively configured to perform one or more functionalities of the computing device 1400 as described herein. In some embodiments, the processor 1402 can be configured to execute instructions that can be stored at the computing device 1400 and/or that can be otherwise accessible to the processor 1402. As such, whether configured by hardware or by a combination of hardware and software, the processor 1402 can be capable of performing operations and actions in accordance with embodiments described herein.

The computing device 1400 can also include a user input device 1404 that allows a user of the computing device 1400 to interact with the computing device 1400. For example, the user input device 1404 can take a variety of forms, such as a button, keypad, dial, touch screen, audio input interface, visual/image capture input interface, input in the form of sensor data, etc. Still further, the computing device 1400 can include a display 1408 (screen display) that can be controlled by the processor 1402 to display information to a user. The controller 1410 can be used to interface with and control different equipment through an equipment control bus 1412. The computing device 1400 can also include a network/bus interface 1414 that couples to a data link 1416. The data link 1416 can allow the computing device 1400 to couple to a host computer or to accessory devices. The data link 1416 can be provided over a wired connection or a wireless connection. In the case of a wireless connection, the network/bus interface 1414 can include a wireless transceiver.

The computing device 1400 can also include a storage device 1418, which can have a single disk or several disks (e.g., hard drives) and a storage management module that manages one or more partitions (also referred to herein as "logical volumes") within the storage device 1418. In some embodiments, the storage device 1418 can include flash memory, semiconductor (solid state) memory or the like. Still further, the computing device 1400 can include Read-Only Memory (ROM) 1420 and Random Access Memory (RAM) 1422. The ROM 1420 can store programs, code, instructions, utilities or processes to be executed in a non-volatile manner. The RAM 1422 can provide volatile data storage, and store instructions related to components of the storage management module that are configured to carry out the various techniques described herein. The computing device 1400 can further include a data bus 1424. The data bus 1424 can facilitate data and signal transfer between at least the processor 1402, the controller 1410, the network/bus interface 1414, the storage device 1418, ROM 1420, and RAM 1422.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method operable by a multi-axis lathe tool having multiple spindles for forming multiple enclosures for portable electronic devices from a single substrate, wherein each of the spindles is configured to secure a substrate that is characterized as having a longitudinal axis, the method comprising:
while the substrate is secured to a first spindle:
forming an interior recess within the substrate by removing a first portion from the substrate by using a cutting tool;
subsequent to forming the interior recess within the substrate, securing the substrate to a second spindle with the interior recess; and
while the substrate is secured to the first and second spindles;
forming an enclosure by removing a second portion from the substrate while the substrate rotates about the longitudinal axis, wherein the enclosure is secured to the second spindle with the interior recess,
separating the enclosure from the substrate by using the second spindle, thereby forming a remaining portion of the substrate,
machining an opening into a sidewall of the enclosure while the enclosure is secured to the second spindle with the interior recess, wherein the enclosure is capable of carrying a component within the interior recess, and
forming an additional enclosure by machining the remaining portion of the substrate with the first and second spindles.

2. The method of claim 1, wherein, while the enclosure is secured to the second spindle with the interior recess, the method further comprises:
performing a cutting operation on the enclosure to define an exterior region of the enclosure.

3. The method of claim 2, wherein, subsequent to separating the enclosure from the substrate, the method further comprises:
forming the sidewall extending around the interior recess; and
forming a curved region extending from the sidewall.

4. The method of claim 3, further comprising:
performing a first material removal operation at the sidewall and the curved region to define a first reflectivity of the sidewall and the curved region; and
performing a second material removal operation at the exterior region to define a second reflectivity of the exterior region, wherein the second reflectivity is different from the first reflectivity.

5. The method of claim 1, wherein the opening includes a chamfered edge that surrounds the opening.

6. The method of claim 3, wherein the exterior region, the sidewall, and the curved region are formed using a single cutting tool, such that the exterior region, the sidewall, and the curved region are characterized as having a continuous and consistent finish.

7. The method of claim 1, wherein the second spindle moves in a circular motion in a Y-Z plane, and a machining tool used to form the opening in the sidewall enters the sidewall along an X-axis.

8. A non-transitory computer readable storage medium storing instructions that, when executed by at least one processor of a system, cause the system to execute steps for forming multiple enclosures for portable electronic devices from a substrate that include:
while the substrate is secured to a first spindle:
performing a first cutting operation at a cutting surface of the substrate to form an interior recess within the substrate by removing a first portion from the substrate by using a cutting tool;
subsequent to forming the interior recess within the substrate, securing the substrate to a second spindle by using the interior recess; and
while the substrate is secured to the first and second spindles:
forming an enclosure by removing a second portion from the substrate, wherein the enclosure is secured to the second spindle with the interior recess,
separating the enclosure from the substrate by using the second spindle, thereby forming a remaining portion of the substrate,
machining an opening into a sidewall of the enclosure while the enclosure is secured to the second spindle with the interior recess, wherein the enclosure is capable of carrying a component within the interior recess, and
forming an additional enclosure by machining the remaining portion of the substrate with the first and second spindles.

9. The non-transitory computer readable storage medium of claim 8, wherein the at least one processor further causes the system to execute steps that include:
performing a cutting operation on the enclosure to define an exterior region of the enclosure.

10. The non-transitory computer readable storage medium of claim 9, wherein, subsequent to separating the enclosure from the substrate, the at least one processor further causes the system to execute steps that include:
forming the sidewall extending around the interior recess.

11. The non-transitory computer readable storage medium of claim 10, wherein the at least one processor further causes the system to execute steps that include:
forming a curved region extending from the sidewall.

12. The non-transitory computer readable storage medium of claim 8, wherein the opening includes a chamfered edge that surrounds the opening.

13. The non-transitory computer readable storage medium of claim 8, wherein second spindle moves in a circular motion in a Y-Z plane, and a machining tool used to form the opening in the sidewall enters the sidewall along an X-axis.

* * * * *